INVENTOR
William A. Seymour.
BY
ATTORNEY

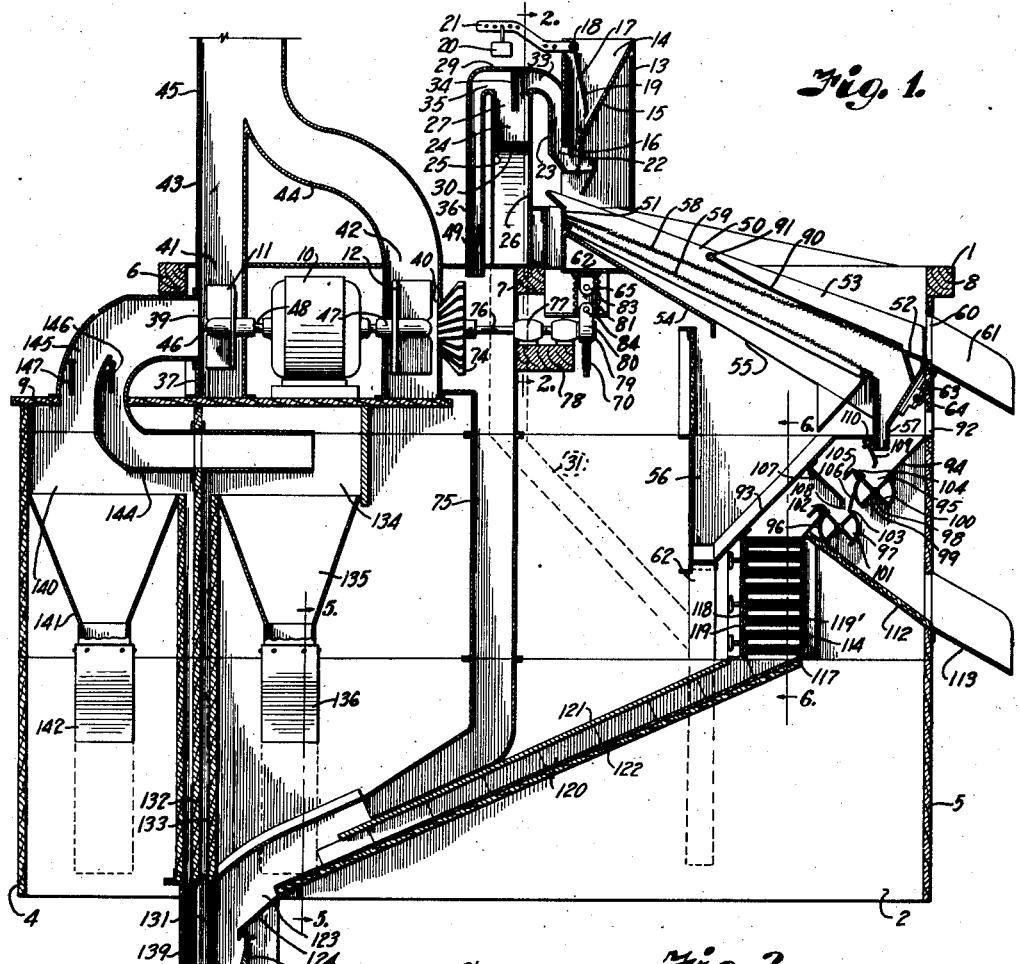
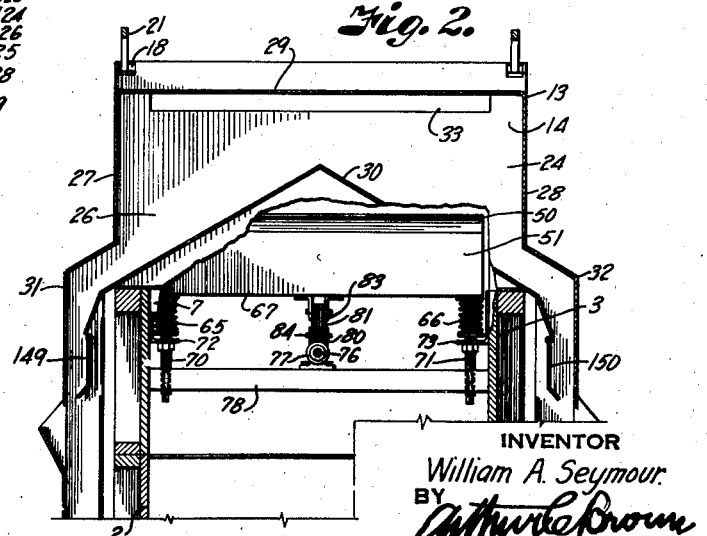

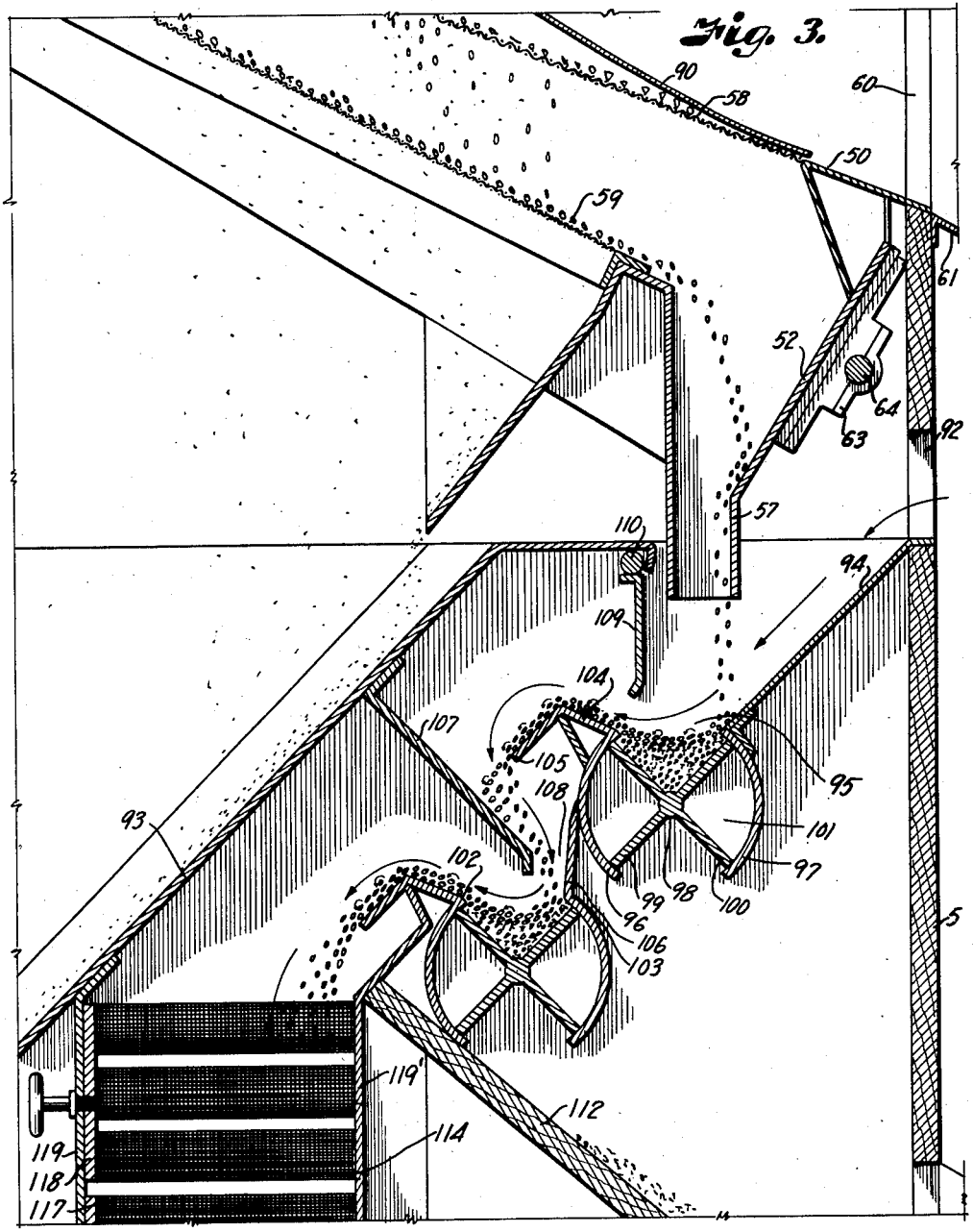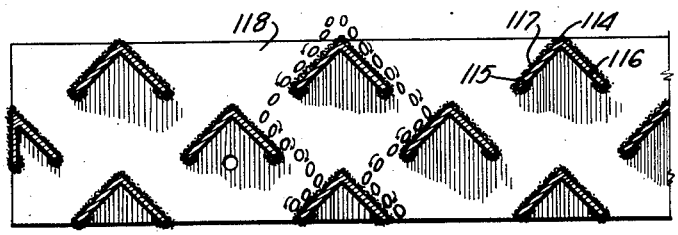

Patented Nov. 9, 1937

2,098,521

UNITED STATES PATENT OFFICE 2,098,521

APPARATUS FOR PROCESSING GRAIN

William A. Seymour, Leavenworth, Kans.

Application July 3, 1933, Serial No. 678,884

3 Claims. (Cl. 83—35)

My invention relates to an apparatus for preparing grains prior to their processing, as in the manufacture of food products, and has for its principal object to effectively and efficiently clean the grain of foreign matter and remove cracked grains and the like.

Other important objects of the invention are to eliminate all milling separators, scourers and aspirators in preparing the grain, to grade the grains according to their respective weight classifications, to clean, scour and polish the grain by inducing individual rolling motion of each grain berry under influence of a propelling air stream, and to eliminate crackage of the grain in the cleaning, scouring and polishing process.

It is also an important object of the invention to reduce the power required to clean a given volume of grain and to eliminate rotating parts that crack the grains and which necessitate belt or gear drives that consume the power of the prime mover to operate them.

In accomplishing these and other objects of my process, I employ an improved apparatus, the preferred form of which is illustrated in the accompanying drawings, wherein:

Fig. 1 is a vertical longitudinal section through a combined cleaning, separating, scouring, polishing and grading machine constructed in accordance with my invention.

Fig. 2 is a cross section on the line 2—2, Fig. 1 through the rolling aspirator portion of the machine, by which chaff, dust, etc., are removed from the grain stream before the grain passes onto the riddle.

Fig. 3 is an enlarged detail section through the lower end of the riddle, the separator and the upper part of the polisher, particularly illustrating the passage of a grain stream therethrough in a tortuous path.

Fig. 4 is an enlarged cross sectional view through a portion of the scourer.

Figure 5:
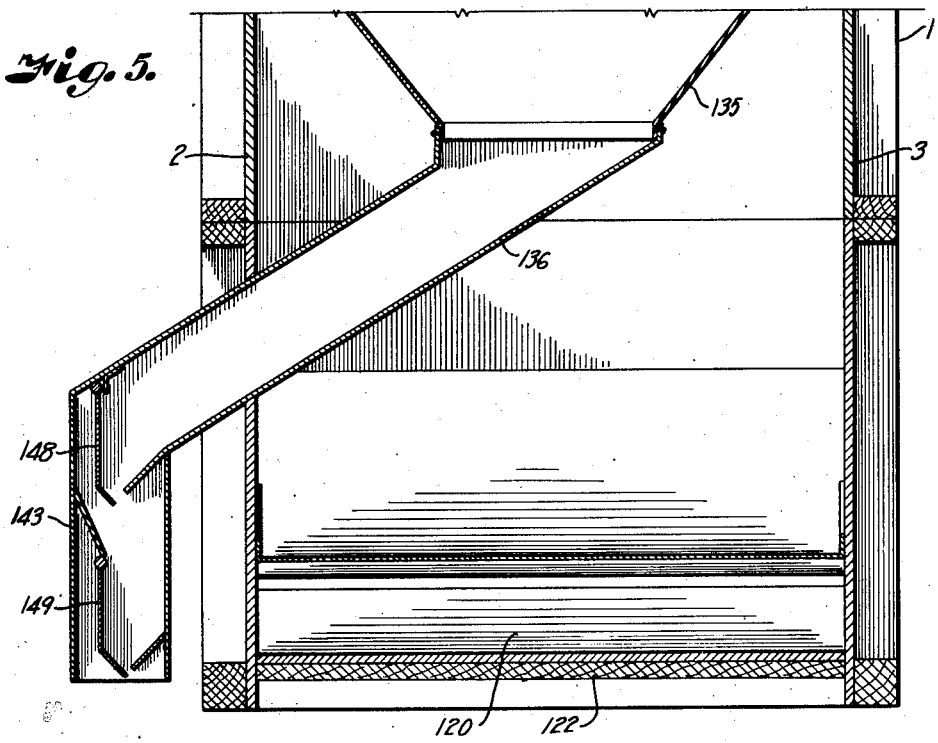
Fig. 5 is a detail cross sectional view on the line 5—5, Fig. 1, particularly illustrating the grain outlet from the first grader.

Referring more in detail to the drawings:

1 designates the casing of the machine which includes spaced side walls 2 and 3, and end walls 4 and 5, the side walls being connected by cross beams 6, 7 and 8. Spaced below the cross beams at the end of the casing adjacent the wall is a horizontal deck 9 forming a support for a prime-mover 10 and grader and vacuum fans 11 and 12, respectively.

Supported by the side walls of the casing at a point above the beam 7 is a feeder 13 through which grain is delivered onto a riddle from a suitable spout, not shown, it being the function of the feeder to change the flow of grain into a thin even stream extending entirely across the width of the riddles.

In the illustrated instance, the feeder includes a hopper shaped trough 14 having an inclined bottom 15 sloping towards the outlet 16 that is spaced above the inner end of the riddle whereby the grain drops through an aspirating current of air on its way to the shoe.

The grain is spread for even flow down the bottom 15 of the hopper by a movable plate 17 having its upper edge fixed to a rod 18 pivotally mounted in the end walls of the feeder housing, so that its lower edge 19 is adjustably movable to and from the bottom 15 to vary the thickness of the grain stream, as set by a counter-balance weight 20 adjustably attached to a lever arm 21 fixed to an end of the rod 18.

The air drawn through the relatively thin stream of gravitating grain is effective in removing the chaff, dust and like materials carried therewith and is induced through a vacuum nozzle 22 located directly below the discharge of the feeder and which extends across the width of the grain stream. The nozzle 22 is connected by an upwardly extending vertical duct 23 with an expansion chamber 24 that is supported above the beam 7 in parallel relation with the feeder 13. The expansion chamber is formed by spaced front and rear walls 25 and 26 connected by end walls 27 and 28 and a top wall 29. The bottom wall 30 of the expansion chamber diverges downwardly toward the opposite walls 27 and 28 to guide material that may settle in the chamber into off-take chutes 31 and 32 extending downwardly at the respective sides of the machine, as best illustrated in Fig. 2.

The duct 23 discharges into the expansion chamber through an elongated opening 33 located just below the top 29 and the air stream is spread across the width of the expansion chamber by a plate 34 having its lower edge terminating below the lower edge of the opening 33.

The expansion of the air in the chamber reduces the velocity thereof to cause the heavier materials drawn from the grain stream to gravitate to the bottom of the chamber for discharge through the chutes 31 and 32, but the light materials which cannot be settled are carried away with the air stream through an outlet 35 formed in the upper portion of the wall 26, and into a downturned conduit 36 discharging into the main vacuum trunking later described.

The grader and vacuum fans 11 and 12 include housings 37 and 38 respectively having axial inlets 39 and 40 and tangential discharge outlets 41 and 42 connected by branch ducts 43 and 44 with a common discharge duct 45 through which the materials that are too light to be settled in the machine are discharged to a suitable dust collector, not shown. The fans 11 and 12 are of the radial blade type and have their hubs 46 and 47 mounted on the respective ends of the armature shaft 48 of the motor 10, as illustrated in Fig. 1, so that the motor 10 drives both of the fans.

The amount of air drawn through the aspirator nozzle by the fan 12 is controlled by a damper 49 located adjacent the discharge outlet of the duct 36.

The riddle 50 is for the purpose of removing foreign material that is either larger or smaller than the grain being cleaned, and includes a rectangular frame conforming in shape to the space between the beams 7 and 8 and the side walls of the casing and includes end plates 51 and 52 connected by downwardly inclined side plates 53 carrying an inclined bottom 54 terminating short of the end plate 52 to provide an outlet 55 opening to a pit 56.

The bottom 54 also includes an outlet spout 57 leading to the separator portion of the machine later described. Supported in the riddle frame and inclined downwardly therein is an upper scalping screen 58 and a lower sand screen 59, the scalping screen 58 having a suitable size mesh to permit passage of the grain delivered to the machine, but the sand screen 59 is of smaller mesh so that the grain passes to the spout 57 for delivery to the separating, polishing and scouring portions of the machine.

It is, therefore apparent that the foreign grains, rocks, sticks, and any materials too large to pass through the scalping screen will gravitate over the screen for passage through an outlet opening 60 in the end wall 5 of the casing for discharge from the machine through a scalping boot 61.

The grains and foreign material smaller in size than the mesh of the scalping screen will drop therethrough onto the sand screen. The grains and other materials of larger diameter than the openings in the sand screen will gravitate down the upper surface thereof and discharge into the outlet spout 57, but the smaller materials carried with the grain will pass through the sand screen and be discharged into the pit 56 from which they will be carried off by means of a lateral spout 62 communicating with the off-take chutes 31 and 32, previously described.

In order to assist separation of the different materials by the respective screens, I provide means for automatically vibrating the riddle, as now to be described.

The rear or lower end of the riddle frame is pivotally supported by bearings 63 attached to the end wall 52 and mounted on a cross shaft 64 having its ends supported by the sides of the casing 2 and 3. The opposite or upper end of the shoe is supported by springs 65 and 66 having their upper ends bearing against a horizontal plate 67 connecting the end wall 51 with the bottom 54 of the frame, as illustrated in Figs. 1 and 2.

The lower ends of the springs 65 and 66 are supported by tensioning screws 70 and 71 adjustably mounted in brackets 72 and 73 fixed to the inner side walls of the casing at points in line with the upper end of the riddle frame as clearly illustrated in Fig. 2, so that the tension and vibratory frequency of the springs may be regulated to that best suited to keep the sand screen clear and to move the scalp toward the outlet 60.

In order to actuate the riddle on the springs 65 and 66, I provide a turbine type fan 74 carried in axial alignment with the inlet to the vacuum fan 12, Fig. 1, and which is automatically operated by movement of the air drawn into the fan housing through a vertical duct 75 from polishing and separating chambers later described.

The turbine fan 74 is fixed to a shaft 76 rotatably mounted in spaced anti-friction bearings 77 carried on a cross beam 78 extending between the side walls 2 and 3 at a point below the beam 7.

The opposite end of the shaft 76 carries an eccentric 79 mounting an eccentric yoke 80 that is connected by a flexible link or pitman 81 with a yoke 83 projecting from the lower face of the plate 67.

In the illustrated instance, the eccentric 79 is approximately 1/32 of an inch off center, so that the eccentric yoke has a travel of approximately 1/16 of an inch reciprocatory movement, whereby the inner end of the riddle is moved through a very short arc relative to the pivotal mounting at the opposite end thereof.

In order to increase the impulses or jarring effect on the riddle afforded by the springs 65 and 66, I prefer to provide a loose connection of the eccentric strap with the pitman 81. This is accomplished by providing an elongated opening in the lower end of the pitman to receive the pin 84 connecting the eccentric yoke 80, so that upon each revolution of the eccentric a sharp jar is imparted to the riddle at the end of the upper and lower strokes of the eccentric.

This is very important as it produces a peculiar wave or ripple like motion in the movement of the riddle that greatly assists in the separation of the materials carried in the grain stream. The grain, therefore, moves down the scalping screen by a series of slight hops to produce a uniform travel and to assure that all of the materials capable of being separated by the screens are eliminated from the grain stream.

In order to prevent sticks, oats, elongated weed joints and the like from up-ending and passing through the scalping screen along with the grain stream, I provide a curtain having a smooth surface 90 positioned so that its lower end bears loosely on the scalping screen and its opposite end is supported in spaced relation therewith by means of a rod 91 having its ends mounted in the side frame members 53 of the riddle frame. The curtain thus bears on the screen and tends to retain the sticks and other materials in sliding parallel contact with the screen, so that they are discharged to the scalping boot 61.

The grain and materials too large to drop through the sand screen 59 will be discharged through the spout 57 across the path of an air stream created by the vacuum fan and which is admitted to the casing through an opening 92 formed in the end wall 5 at a point above the separator portion of the machine, now to be described.

This portion of the machine is best illustrated in Fig. 3 and includes an arrangement of baffles and air controls so that the grain is moved in a tortuous path under influence of air draw through the opening 92 by the vacuum fan 12, the air travelling in the same direction as the grain and pressing the grain against the supporting surfaces to effect a retarding action beneath and a propelling action above the grain stream that promotes rolling of the berries during their travel through the apparatus.

This sinusoidal movement of the grain induces individual rolling motion to each grain berry and every particle of foreign matter carried therewith whereby foreign materials are caused to be removed from the grain stream due to differential rolling characteristics of the respective shapes of the different materials.

For example, the grains, being of the same respective shape, will have the same rolling characteristics and are driven at the same relative rate of speed through the separator. But the foreign materials that are of different shape have different rolling characteristics and, therefore, cannot roll at the same speed or in the same straightaway direction through the separator as do the individual grain berries. Consequently, they will be crowded out of the grain stream by the individual berries to become entrapped in pockets provided to receive them. This individual rolling movement of the grain also performs the more important function of tending to remove foreign material clinging to the surface of the grain berries.

The separator mechanism is carried between the downwardly inclined bottom 93 of the pit 56 and a similarly inclined plate 94 spaced therefrom and in which is interposed a series of grain traps 95, there being two in the present illustrated instance.

Each grain trap includes spaced arcuate plates 96 and 97 having their ends supported by the side walls 2 and 3 of the casing 1 and their upper and lower edges spaced apart in the same horizontal planes, as shown. Rotatably mounted between the plates is a rotary type valve 98 having lateral arms 99 and 100 forming a series of V-shaped pockets 101 therebetween cooperative with the upper edges 102 and 103 of the arcuate plates to form pockets for a body of the grain being delivered through the machine, as clearly illustrated in Fig. 3.

The upper edges 102 of the arcuate plates 96 terminate in upwardly and laterally inclined plate portions 104 having downwardly inclined lips 105 extending parallel with the inclined walls 93 and 94, the upper edge of the arcuate plate 97 for the first stage being connected to the wall 94 and the similar plate of the second stage is connected to the arcuate plate 96 of the first stage by a vertical plate portion 106 which cooperates with a downwardly extending diaphragm 107 to form a throat 108 through which the grain stream is discharged from the first stage into the second under influence of the air stream drawn through the opening 92.

In order to control the passage of the air stream and retain it in close contact with the surface of the grain retained in the pocket 101 of the first separator trap, I provide a damper plate 109 having its upper end fixed to a rod 110 that is pivotally mounted in the side walls of the separator adjacent the discharge chute of the scalping shoe, whereby the lower end of the plate is swingingly adjustable relatively to the inclined plate 104 to control the effective opening therebetween and thereby regulate the velocity of the air passing through the separator.

As the grain stream gravitates from the spout of the scalping shoe, it will first fill the pocket of the first separator. As the grain builds up in the pocket, it will come in contact with the air stream passing thereover and the grain will be rolled out of the pocket, up the vertically inclined plate 104 and down the lip 105 onto the diaphragm plate 107.

As the grain is rolled by the air stream across the material carried in the pocket 101, the slower rolling materials and grains having different rolling characteristics than the grain being cleaned will be crowded into the material carried in the pocket. This includes all foreign materials of substantially the same size as the grain being cleaned.

The grain will then gravitate under influence of the air stream down the diaphragm plate for discharge through the throat 108 where the grain is rolled across the material trapped in the pocket of the second separator to entrap foreign materials that may have passed the first separator. The air continues to roll the grain across the second pocket, up the inclined plate 104 and over the lip 105 of that stage from where it is discharged into the scouring chamber, later described.

As above mentioned, this portion of the machine not only serves as a separator, but the rolling contact of the grain berries with each other loosens surface materials therefrom, which are carried away by the faster moving air stream after passing the diaphragm 107.

When the pockets become filled with entrapped foreign materials, the valves 98 are moved to bring another pocket into position to receive and trap the foreign materials from the grain. As the full pockets are moved across the lower edges of the arcuate plates 96 and 97, the entrapped foreign materials will be gravitated onto an inclined bottom 112 and discharged from the lip through a chute 113.

Arrangement of the edges of the valve blades 99 and 100 in sealing contact with the arcuate plates 96 and 97 prevents air from being drawn through the discharge spout 113 that might cause the entrapped materials carried in the pockets to be drawn back into the machine at the time they are being dumped, and avoids necessity for shut down of the machine during the dumping operation.

The tortuous scouring members including a plurality of vertical, horizontally spaced series of angle members 114, each including downwardly diverging plates 115 and 116 covered by a screen material 117 adapted for scouring and polishing grain berries passed thereover the members 114 in one horizontal row of members being staggered with respect to the members in the next adjacent lower row so that when the grain strikes the plates 115 and 116 of the upper row of members, it will be diverted outwardly and laterally to engage the oppositely inclined plates in the next lower row.

Upon striking the plates, the grain will gravitate over the screen covering onto the oppositely inclined plates in the next lower row and so on to the bottom of the scouring chamber. The angle members 114 are supported in sets of three on bars 118 and are positioned between cross plates 119 and 119' having their upper ends connected to the downwardly sloping walls 93 and 94 of the scouring chamber, as best illustrated in Fig. 1.

Mounted below the outlet of the scouring chamber is an inclined polishing chamber 120 formed by upper and lower downwardly inclined plates 121 and 122 carried by the side walls of the casing, the upper plate 121 terminating short of the lower plate 122 which extends to the lower edge of the side walls, as illustrated in Fig. 1. The upper surface of the lower plate is covered with an abrasive material having sufficient coarseness to prevent the grain from sliding, but induces it to roll under influence of the air stream.

From the polishing chamber, the grain gravitates into a grading chamber 123 hereinafter described.

The vacuum fan 12 is of a capacity to generate a sufficient amount of vacuum to pull the wheat through the separator, scouring and polishing portions of the machine and through the duct 75 which has its lower end communicating with the lower end of the polishing chamber in such a manner that the air upon leaving the grain is drawn upwardly and retractively over the terminus of the plate 121 so that it does not have a tendency to carry the grain therewith.

However, all the dust and crease dirt removed in the scouring and polishing chambers will be carried by the air and discharged through the branch 44 into the duct 45, previously described.

Upon leaving the polishing floor 122, the grain moves into an expansion valve chamber and across the downwardly extending plate 124 and banks between a fixed lip 125 and a pivoted expansion valve 126, which is normally closed by suction of the fan 12.

When a sufficient weight of grain has accumulated in the expansion chamber to overcome the suction of the valve, the valve will open under the weight of the grain, which will then gravitate onto a second downwardly inclined plate 128.

As the grain gravitates from the plate 128 onto a grader tip 129, the air stream is drawn through the grain to remove the lighter particles such as cheat, weed seed, etc., that have not been previously removed and which are drawn upwardly through a vertical duct 131 formed between spaced partitions 132 and 133 extending upwardly within the casing 1, where it is discharged into an expansion chamber 134. The expansion chamber 134 is formed below the sub-deck 9 and is of large enough capacity to reduce the velocity of the air and permit the graded material to drop into the hopper-shaped bottom 135 thereof, where it is discharged through an off-take chute 136 extending through the side 2 of the casing. The grain stream, upon being relieved of the cheat, weed seeds, etc., gravitates from the grader tip 129 onto a second inclined plate 137 from where it gravitates onto a second grader tip 138.

As the grain is moving from the plate 137 a second stream of air is drawn therethrough to remove the next heavier stock, such as the shriveled grains, which are drawn by the air upwardly through a second vertical conduit 139 for discharge into a second expansion chamber 140 from between the partition 132 and the end wall 4 of the casing, where the removed material gravitates into the hopper bottom 141 and out through an off-take chute 142. The grain then passes off through a throat 143 and is discharged from the machine.

The air, upon expanding in the expansion chamber 134 is drawn through a duct 144 to the inlet of the grader fan 11, which discharges it from the machine.

The air in the expansion chamber 140 is removed from the machine through a duct 145 connected with the inlet to the fan 11, the ducts 144 and 145 being controlled by suitable valves 146 and 147, respectively.

The outlets from the chutes 136 and 142 are controlled by swinging dampers 148 and 149 alternately opened by the weight of the materials to deliver the separated materials from the machine and to seal the ducts against the entrance of air therethrough.

In operating a machine in accordance with my improved method, the grain is delivered to the feeder 13 and the weight 20 is adjusted to retain the plate in the required position to distribute grain onto the scalping shoe.

The motor 10 is then energized to start operation of the vacuum and grader fans. As soon as the fans start operation, a stream of air is drawn from the inlet 92 through the tortuous separator section, through the scouring section chamber, through the polishing chamber, ducts 75, and turbine fan 74, to the inlet 40 of the vacuum fan, the air stream being discharged through the branch duct 44 to the duct 45 leading to a suitable dust collector.

Simultaneously, a second air stream is drawn through the grain gravitating from the feeder, through the vacuum nozzle 22, settling chamber 24, duct 36, through the turbine fan and inlet 40 to the fan 12.

As the grain drops from the outlet of the feeder onto the scalping shoe, dust, chaff, and other like materials are removed from the grain stream by the air passing therethrough.

The air upon entering the settling chamber expands to permit the heavier material to settle in the chamber for discharge through the spouts 31 and 32, the valves 148 and 149 responding to volumetric flow of grain from the chutes so as to maintain the chutes sealed to the inlet of air.

The grain and heavy foreign matter will drop onto the scalping screen 58 which is being vibrated by the turbine fan 74 which is operated by the air stream drawn through the duct 75 by the vacuum fan 12.

Upon engaging the screen, the grain and small particles of foreign matter pass therethrough onto the sand screen, but the sticks, rocks and foreign matter, too large to go through the scalping screen, will be gravitated down the screen for discharge through the scalping boot 61. Upon reaching the sand screen, foreign matter, weed seeds, and other materials small enough to pass through the sand screen will pass directly therethrough into the hopper 56 and be discharged through the ducts 62.

The grain, including the matter too large to pass through the sand screen will gravitate through the spout 57 into the first stage of the separator to fill the pocket 101, thereby forming a trap to retain foreign matter having different rolling characteristics than that of the grain.

The valve plate 109 is adjusted to control the velocity of air through the separator and, consequently, control the rolling action of the grain and the velocity thereof as it is passed through the machine. Incoming grain reaching the trap of the first stage will be rolled over the surface of the grains in the pocket and any foreign materials having different rolling characteristics than the grain will be trampled by the rolling grain into the grain carried in the pocket. For example, particles of stone, tacks, particles of metal, and other objects having shapes other than that of the grain will have different rolling properties and will roll in different directions or at different speeds than the grain, so that the foreign objects, whatever they may be, will be trampled into and trapped by the grain remaining in the pockets. The grain will continue to roll up the inclined plate 104 and down the lip 105 under influence of the air stream passing to the valve plate 109. The grain will then be discharged under the force of the air stream against the diaphragm 107, the impact thereof loosening the dirt on the surface of the grain. The grain then gravitates down the diaphragm and drops through the throat 108 into the second stage of the separator. The grain continues its rolling motion across the surface of the grain trapped in the pocket of the second separator to roll out any foreign material that may be carried over from the pocket of the first stage. The grain then rolls over the inclined plate and lip of the second stage and is discharged into the scour.

Figure 6:
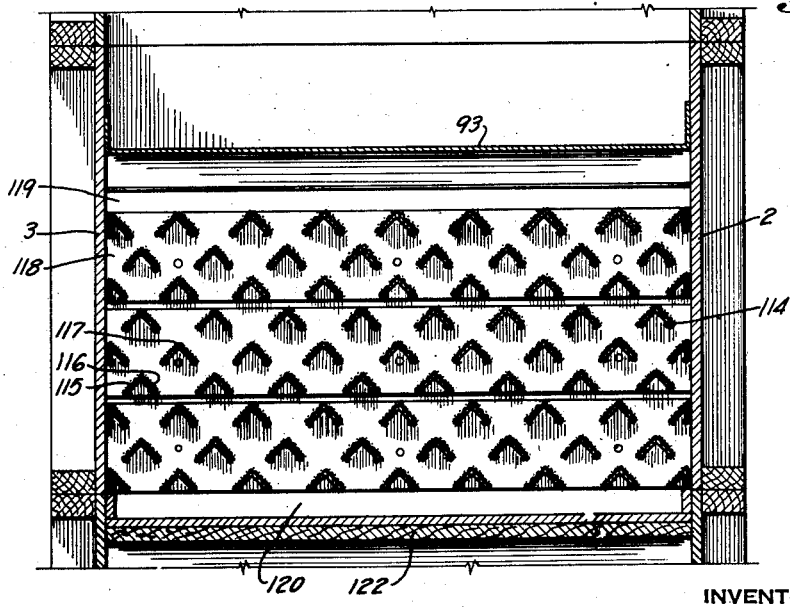
Fig. 6 is a cross sectional view through the scourer on the line 6—6, Fig. 1.

The grain dropping onto the upper row of baffle plates 114 and 115 is divided and rolled over the scouring screens covering the plates, the screens loosening the fibrous matter and fuzz which covers the grain berry. The individual streams divided by the upper row of plates are directed onto the next lower row and so on to the bottom of the scourer. Each stream of grain, therefore, moves in vertical tortuous paths, as indicated by the arrows in Fig. 6.

The grain berries, on being discharged from the scouring portion of the machine, drop onto the polishing floor 122 over the abrasive material which prevents the grain from sliding and keeps it in rolling motion.

By the time the berries have reached the end of the polishing floor, fuzz and other material have been moved from the surface of the grain berries and clean, polished grain berries are delivered into the expansion valve 126.

All the dust and crease dirt, including the fibrous material, are carried away by the air stream and discharged through the conduit 75, branch conduit 44, and duct 45.

When a sufficient amount of grain is collected above the expansion valve 126, the valve is cracked open against air pressure acting to retain it closed, and the stream of clean grain drops from the plate 128 onto a grader tip 129. Air is then drawn through the grain stream to remove stock of lighter weight than that which is to be delivered to the processing machinery.

The light grain removed from that desired for processing is drawn through the vertical duct 131 and through the expansion chamber 134 of the first grader where the velocity of the air is reduced because of increased capacity of the chamber to permit the light stuff to settle in the hopper 135. Dust and air then pass from the expansion chamber through the duct 144 and out the duct 41 under influence of the grader fan 11.

The velocity of the air, and consequently the grade of the material delivered into the first grader is adjusted by the air control valve 146.

As the grain stream drops across the lower grader tips 137 and 138, air is drawn between the plate 128 and the plate 137 to remove a second heavier stock through the duct 139 into the expansion chamber 140 where that stock settles and the air is delivered through the duct 144 to the discharge duct 45, the velocity of the air being controlled by the air control valve 147 to grade the stock delivered into the hopper 140.

The stock removed through the first and second graders will drop through the respective chutes 136 and 142 past the expansion valves 148 and 149 which retain the discharge openings of the chutes closed against the grain stream to prevent air from being drawn retractively therethrough.

From time to time, the valves in the separator stages will be rotated to dump the material that has been trapped in the pockets.

From the foregoing description, it is obvious that I have provided a method of preparing grain for processing which is carried out in a single machine having no rotating parts in actual contact with the grain, since the entire preparation is carried on by the action of air. I am, therefore, enabled to eliminate crackage of the grain and can operate with less horse-power, as no energy is consumed in driving belts, gears, and the like that are necessary in present methods.

By propelling as well as cleaning the grain with air I eliminate cracking of the grain incident to beating of the grain with mechanical apparatus, and save the energy required for driving such apparatus.

What I claim and desire to secure by Letters Patent is:

1. Apparatus of the character described including a support for a travelling stream of grain, a vibrator adapted for delivering grain onto said support, means for inducing a stream of air over the support in the direction of travel of the grain stream, means for confining the air stream in tangential pressing contact with said grain stream to effect rolling action of the grain particles in response to thrust of said particles against the support by the air stream and propulsion of said particles in response to said tangential contact of the air stream with said particles.

2. Apparatus of the character described including a support for a travelling stream of grain, a vibrator adapted for delivering grain onto said support, means for inducing a stream of air over the support in the direction of travel of the grain stream, means for confining the air stream in tangential pressing contact with said grain stream to effect rolling action of the grain particles in response to thrust of said particles against the support by the air stream and propulsion of said particles in response to said tangential contact of the air stream with said particles, and means located in and actuated by the air stream for actuating the vibrator.

3. Apparatus of the character described including a support for a travelling stream of grain, a vibrator adapted for delivering grain onto said support, means for inducing a stream of air over the support in the direction of travel of the grain stream, means for confining the air stream to effect rolling action of the grain particles in response to thrust of said particles against the support by the air stream and propulsion of said particles in response to tangential contact of the air stream with said particles, a turbine located in and operable by the air stream, and means operatively connecting the turbine with said vibrator.

WILLIAM A. SEYMOUR.